Figure 1:
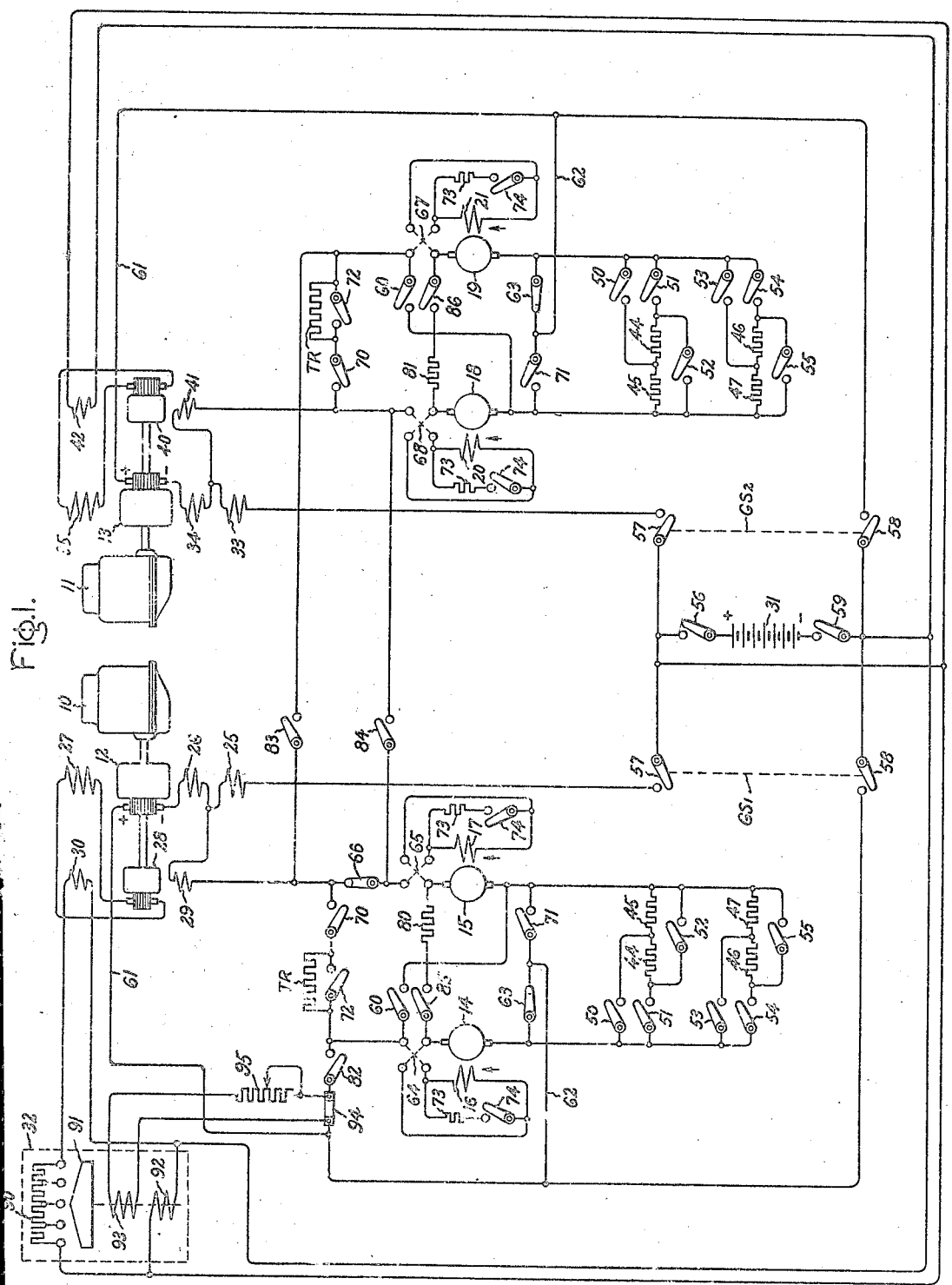

Dec. 22, 1942. H. S. OGDEN 2,306,182
DYNAMIC BRAKING SYSTEM
Filed Oct. 15, 1941 2 Sheets-Sheet 2
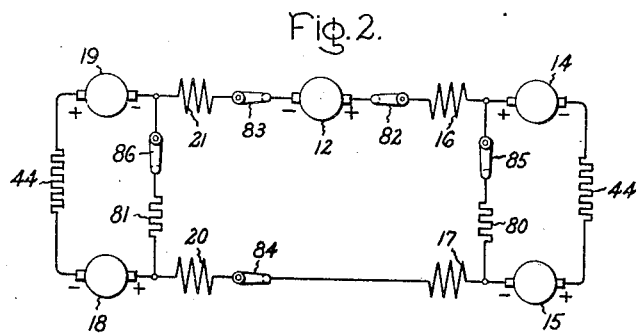
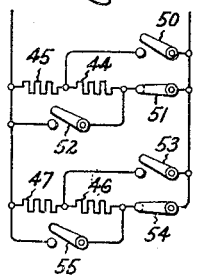
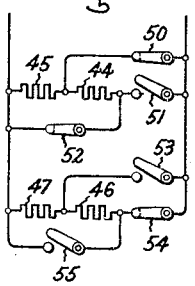
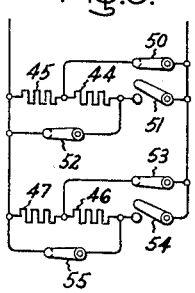
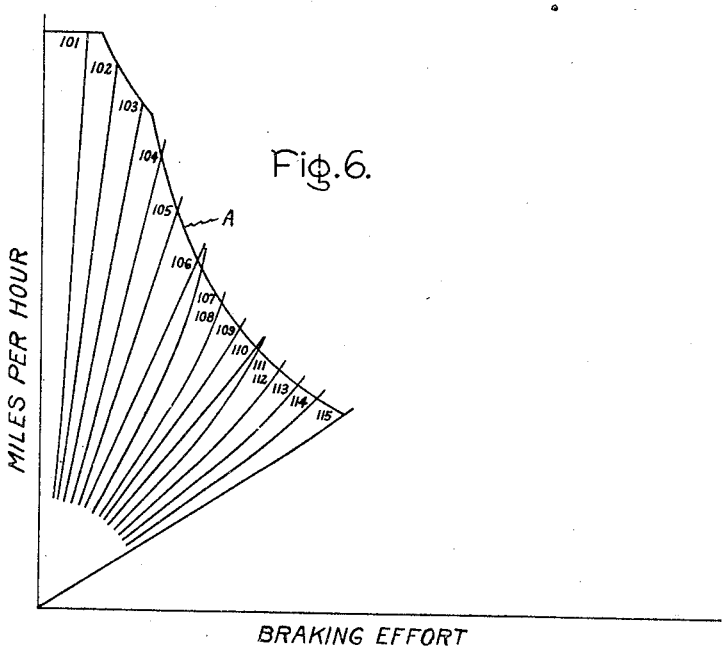
Inventor:
Harold S. Ogden,
by Harry E. Dunham
His Attorney Patented Dec. 22, 1942

2,306,182

UNITED STATES PATENT OFFICE 2,306,182

DYNAMIC BRAKING SYSTEM

Harold S. Ogden, Erie, Pa., assignor to General Electric Company, a corporation of New York Application October 15, 1941, Serial No. 415,060

15 Claims. (Cl. 172—179)

My invention relates to dynamic braking systems and particularly to differential dynamic braking systems applicable to gas- or Diesel-electric self-propelled vehicles having one or more complete power plants.

It is well understood that in a self-propelled power plant such as a Diesel-electric locomotive, space is at a premium. Since the traction motors which are generally in use today are essentially constant kilowatt machines over a very wide range of speed, the braking resistors into which they pump power during dynamic braking must have a high ohmic value and a low current capacity at high speed, and a correspondingly high current capacity and low ohmic value at low speed. Since the kilowatts to be dissipated at the braking resistor are considerable, especially in a locomotive hauling a long train of cars, the resistor itself takes up considerable valuable space on the locomotive. Furthermore, the variable resistor which is generally used for this purpose is uneconomical, for in reducing the resistance from a maximum value to zero by sequential short-circuiting of portions of the resistor the average amount of resistance used is only half of that provided; i. e., the resistor is only used to approximately one half of its maximum capacity. Furthermore, since such a braking resistor must be cooled by a forced current of air, it is very desirable to insure that all sections of the resistor are in the braking circuit at all times so that the air passing across the resistor will receive its full share of heat, thereby keeping the ventilating requirements to a minimum.

Accordingly, it is one object of my invention to provide a new and improved dynamic braking system for a gas or Diesel-electric self-propelled vehicle.

It is a further object of my invention to provide a self-propelled vehicle with a differential dynamic braking system which will supply a smoothly and gradually increasing braking effort having a limited maximum value.

It is a still further object of my invention to provide a dynamic braking system in which no part of the braking resistor is entirely disabled at any time during the braking sequence, thereby to reduce the size and bulk of the resistor required and to conserve ventilating capacity.

It is another object of my invention to provide a differential dynamic braking system having field control means for gradually controlling the braking effort between points of transfer of the braking resistor connections.

According to my invention, I provide a dynamic braking resistor comprising a plurality of separate resistor sections and switching means for connecting the sections in selectable combinations of series and parallel circuit relation so that various values of total resistance may be obtained while utilizing each section at all times. I also provide regulating means for maintaining a predetermined gradually increasing field excitation current in the traction motors for each selected connection of braking resistor sections. In order to readjust the field current to its proper value for each resistor connection, means are provided for recalibrating the current regulator whenever the braking resistor connections are changed.

My invention itself will be better understood and its objects and advantages further appreciated by referring now to the following detailed specification taken in conjunction with the accompanying drawings in which Fig. 1 is a schematic circuit diagram of an electric vehicle dynamic braking system embodying my invention; Fig. 2 is a simplified circuit diagram of the dynamic braking circuit forming a part of Fig. 1; Figs. 3, 4 and 5 are simplified circuit diagrams showing various connections of the dynamic braking resistor; and Fig. 6 is a graphical representation of the braking effort characteristic provided by my invention.

Referring now to Fig. 1, I have shown a multiple power plant Diesel-electric driving arrangement for a self-propelled vehicle comprising a pair of Diesel engines 10 and 11 connected respectively to drive main direct current generators 12 and 13. The main generator 10 is connected to supply current to a pair of direct current traction motors having armatures 14 and 15 and series field windings 16 and 17, respectively. Similarly, the main generator 13 is connected to supply current to a pair of traction motors having armatures 18 and 19 and series field windings 20 and 21, respectively. The main generator 12 is provided with a starting winding 25, a commutating field winding 26 and a separately excited winding 27 energized by an engine-driven exciter 28. The exciter 28 is energized by means of a differential series field winding 29 carrying the line current from the main generator 12 and a separately excited field winding 30. The separately excited winding 30 is connected to a local source of control voltage, such as a battery 31, through a current regulator or voltage controller 32 which will be more fully described hereinafter. In like manner, the main generator 13 is provided with a starting winding 33, a commutating field winding 34 and a separately excited winding 35 energized by an engine-driven exciter 40. The engine-driven exciter 40 is supplied with excitation by means of a differential series field winding 41 carrying the line current from the main generator 13 and a separately-excited winding 42 connected to the battery 31.

Each pair of traction motors is provided with a braking resistor comprising a plurality of separate sections 44, 45, 46 and 47. The pair of sections 44, 45 are permanently connected in parallel with the pair of sections 46, 47. A plurality of switches 50, 51, 52 is arranged to connect the sections 44 and 45 selectively in series or parallel circuit relation. Similarly, a plurality of switches 53, 54 and 55 is arranged to connect the sections 46 and 47 selectively in series or parallel circuit relation.

In operation, the Diesel engines 10 and 11 are started by using the main generators 12 and 13 as starting motors. This may be done by closing a starting switch GS₁ for connecting the main generator 12 to the battery 31 and closing a starting switch GS₂ for connecting the main generator 13 to the battery 31. The starting circuits for each of the generators are similar and therefore only that for the main generator 12 will be traced by way of illustration. This circuit may be followed from the positive side of the battery 31 through a manually-operable disconnecting switch 56, the contact 57 of the generator starting switch GS₁, the generator starting field 25, the commutating field winding 26, the armature of the main generator 12, the contact 58 of the generator starting switch GS₁ and a manually-operable disconnecting switch 59 to the negative side of the battery 31. Similar reference numerals have been applied to the contacts of the generator starting switch GS₂. With the Diesel engines 10 and 11 operating at their idling speeds, the starting switches GS₁ and GS₂ may be opened and the system is prepared for motoring operation.

In motoring operation each pair of traction motors is first connected in series and is then in parallel to one of the main generators, the circuit for each pair of traction motors being independent. Since the motoring circuits for each pair of motors are similar, only those for the motors connected to the main generator 12 will be traced, similar reference numerals being applied to corresponding parts in the other circuit. To begin acceleration, the motors 14, 16 and 15, 17 are connected in series with each other by closing a series switch 60. The motor circuit may now be traced from the positive brush of the main generator 12 through a conductor 61, a conductor 62, a normally closed braking switch 63, the armature 14, a reversing switch 64 for the series field winding 16, the series field winding 16 in the direction indicated by the arrow, the reversing switch 64, the series switch 60, the motor armature 15, a reversing switch 65 for the series field winding 17, the series field winding 17 in the direction indicated by the arrow, the reversing switch 65, a normally closed braking switch 66, the series field winding 29 and the commutating field winding 26 to the negative brush of the generator 12. The series circuit for the motors 18, 20 and 19, 21 is similar, the reversing switches for the series field windings 19 and 20 being designated as 67 and 68, respectively.

After the vehicle has accelerated to a predetermined point with the traction motors connected in series circuit relation each pair of motors may be transferred to parallel circuit relation in the following manner: Referring to the circuit of the main generator 12, a normally open switch 70 is first closed to connect a transfer resistor TR in shunt circuit relation with the motor 15, 17. The motor 15, 17 is then temporarily de-energized by opening the series switch 60, the power circuit remaining closed through the motor 14, 16 in series with the transfer resistor TR. A normally open switch 71 is then closed to connect the motor 15, 17 in parallel circuit relation with the motor 14, 16 and the transfer resistor TR. To complete the transfer of the motors to parallel circuit relation, a normally open switch 72 may be closed to short-circuit the transfer resistor. When the traction motors have reached the limit of their acceleration in the parallel connection, a higher vehicle speed may be attained by partially shunting the series field windings of the motors. For this purpose each traction motor series field winding 16, 17, 20 and 21 is provided with a shunting resistor 73 and a normally open shunting switch 74.

During motoring operation the regulator 32 is not completely energized and does not function. The inherent voltage characteristic of the exciter 28 is preferably such that during motoring it maintains the desired horsepower characteristic of the electric circuit without external regulation. Such an exciter is described and claimed in Patent 1,969,495 issued to J. C. Barry on August 7, 1934.

I wish to have it understood that while I have shown a plurality of manually-operable switches for controlling the motor circuit, these switches may be, and preferably are, in practice operated either mechanically or electro-magnetically in proper sequence by means of a main controller of the drum type such as is well known to those skilled in the art. Furthermore, the braking contactors to be described hereinafter may be similarly operated in their proper sequence by the same controller or by a separate braking controller. In order to simplify the circuit connections and to clarify the drawings and description, the controller has not been shown.

In dynamic braking operation one of the main generators, operating at the idling speed of its connected Diesel engine, is used to energize the field windings of all the traction motors through a field excitation circuit including the motor field windings and stabilizing resistors 80 and 81. Due to the very low resistance of the motor series field windings and the consequent low voltage required for their excitation, the generator develops more than ample voltage to excite all the fields in series even when driven at the substantially constant low idling speed of the connected engine. The series connection of all the traction motor series field windings is advantageous in that a larger proportion of the normal generator excitation is required so that the generator operates at a point well up on its saturation curve. Such operation of the generator increases its stability and improves its regulation. The traction motor armatures 14 and 15 are connected in series with each other in a dynamic braking circuit including the associated braking resistor and the stabilizing resistor 80 so that the voltage developed in the traction motor armatures opposes the voltage of the main generator. Similarly, the traction motor armatures 18 and 19 are connected in series with the associated dynamic braking resistor in a second dynamic braking circuit including the stabilizing resistor 81. Since the stabilizing resistors 80 and 81 are common to the field excitation circuit and the armature circuits, any surges of current in the armature circuits will properly compensate the current in the traction motor field windings.

To establish dynamic braking, the series and parallel motoring switches 60, 70, 71, 72 and 74 are opened, the braking switches 63 and 66 are also opened, and a plurality of normally open braking switches 82, 83, 84, 85 and 86 are closed. Referring now to Fig. 2, it will be observed that closing of the braking switches 82 to 86, inclusive, completes a closed field excitation circuit which may be traced from the positive brush of the main generator 12 through the switch 82, the traction motor series field winding 16, the switch 85, the stabilizing resistor 80, the traction motor series field winding 17, the switch 84, the traction motor series field winding 20, the stabilizing resistor 81, the switch 86, the traction motor series field winding 21 and the switch 83 to the negative side of the generator 12. In this circuit, current flows through the traction motor series field windings 17 and 21 in the same direction as the current flowing through these windings in motoring operation. The current flows through the traction motor series field windings 16 and 20, however, in a direction opposite to that flowing through these windings during motoring operation. The effect of this arrangement is to reverse the voltage generated in the armatures 14 and 18 so that the voltages of the armatures 14 and 15 for one braking circuit and of the armatures 18 and 19 for the other braking circuit are additive when applied to the braking resistors 44.

The differential dynamic braking connections may now be completed by closing the resistor switches 51 and 54 to complete dynamic braking circuits through the traction motor armatures and the braking resistors. At Fig. 2, the braking resistors have been indicated in simplified form and identified by the reference numeral 44, while Figs. 3, 4 and 5 illustrate the actual connections for the braking resistors, as will be more fully described hereinafter.

Referring now more particularly to Fig. 2, it will be observed from an inspection of the polarities indicated at Figs. 1 and 2 that the voltage generated in the armatures 14 and 15 and the armatures 18 and 19 of the traction motors will be additive. Thus the field current and the armature current generated in the armatures 14 and 15 flow in the same direction through the stabilizing resistor 80, while the field current and the armature current generated in the armatures 18 and 19 flow in the same direction through the stabilizing resistor 81. Each dynamic braking resistor 44 carries only the armature current of the associated traction motor. Due to the differential action of the stabilizing resistors 81, the voltage available for exciting the field windings of the traction motors is dependent on the traction motor armature current flowing in the stabilizing resistor 81. As is more fully described in Patent 2,248,577, issued on July 8, 1941, to Jacob W. McNairy, the result of this arrangement, for any predetermined main generator voltage and dynamic braking resistance value, is that at high vehicle speeds the braking effort does not build up with a series characteristic but tends to limit itself to a definite maximum, while as the speed of the vehicle and the voltage of the armatures decrease, the current through the field windings increases to maintain a substantially constant dynamic braking effort over a wide range of vehicle speeds. It will be understood that where no stabilizing or balancing effects are required, as for the particular instance where no armatures are in parallel, the value of the stabilizing resistors may be zero.

In order to obtain a smooth increase in braking effort as vehicle speed decreases while still providing a limited maximum value of braking effort, I reduce the braking resistance in a plurality of predetermined steps and provide voltage control means in connection with the engine-driven exciter 28 whereby the excitation current through the traction motor field windings is maintained substantially constant for any selected braking resistor resistance value, the voltage controller being recalibrated to maintain a different constant current upon each transfer of braking resistor connections. As previously stated, each section of the braking resistor is in use at all times.

Referring now to Figs. 3, 4 and 5, the particular embodiment of the braking resistor shown in the drawings by way of illustration comprises four sections, 44, 45, 46 and 47, in combination with six control switches 50, 51, 52, 53, 54 and 55 for connecting the sections in selectable combinations of series and parallel circuit relation. In a particular application it has been found that the three points of resistor control shown in Figs. 3, 4 and 5 are sufficient to obtain a smooth increase in braking effort as the vehicle speed decreases. To obtain the maximum resistance, the switches 51 and 54 are closed to connect the pair of sections 44 and 45 in series with each other and to connect the pair of sections 46 and 47 in series with each other, the pairs of sections being permanently connected in parallel. If now it is assumed that the resistance of each resistor section 44, 45 is equal to 3/2R and that the resistance of each resistor section 46 and 47 is equal to 3/4R, the equivalent resistance of the connection shown in Fig. 3 will be found equal to R. For a second point of control, the switch 50 is closed, the switch 51 is opened, and the switch 52 is closed, in the sequence named, thereby to connect the resistor sections 44 and 45 in parallel with each other, the connections of the resistor sections 46 and 47 remaining the same. It will now be found that the equivalent resistance of this arrangement, as shown in Fig. 4, is equal to 1/2R, the total resistance having been reduced to one half while still utilizing all the resistor sections. Similarly, to obtain a third point of control in which the equivalent resistance is equal to 1/4R, the parallel connection of the sections 44 and 45 is left unchanged while the sections 46 and 47 are connected in parallel with each other by first closing switch 53, then opening the switch 54 and finally closing the switch 55. Attention is directed to the fact that the order of switch operation is important in order to maintain the circuit closed at all times.

Referring now to Fig. 6, a braking effort curve similar to the curves 101 to 115, inclusive, will be obtained for each selected connection of the braking resistor under the condition that the current generated by the main generator 12 remains at a constant value. In order to obtain a smooth transfer from one such braking effort curve to another, thereby to obtain a resultant braking effort which increases gradually as the vehicle speed decreases, the regulator 32 is automatically recalibrated upon each change of braking resistor connections and the traction motor field current is allowed to gradually build up to a new constant value. For this purpose the winding 30 of the engine-driven exciter 28 is connected across the battery 31 in series with a variable control resistor 90 forming part of the field voltage controller 32. As shown, the controller 32 comprises a movable conducting segment 91 for gradually short circuiting the control resistor 90 in response to the energization of a fixed actuating coil 92 and a floating coil 93. The fixed coil 92 is connected directly across the battery 31 and carries a predetermined current. The floating coil 93 receives its energization from a shunt 94 in the circuit of the main generator 12. It will be evident that, for the dynamic braking connection, the shunt 94 lies in the traction motor field exciting circuit. Thus the coil 93 carries a current which is proportional to the traction motor field exciting current and actuates the conducting segment 91 in such a manner as to tend to maintain this current constant.

In operation, when the braking resistor sections are connected as shown at Fig. 3 and the regulator 32 has its initial setting, the braking effort will follow the curve 101. When decreasing speed makes it desirable to shift to the curve 102, the setting of the regulator 32 is changed by readjusting resistor 95. Curves 101 to 106, inclusive, are traversed in this manner. When the curve 106 is reached and it is desired to go to curve 107 the braking resistor connections are changed to those shown at Fig. 4 and the regulator 32 is simultaneously recalibrated to maintain a lower constant current due to lower voltage required by the resistor. Thus, the resultant braking effort can build up through the curves 107 to 110 as the traction motor field current is progressively reset at new constant values. Between the curves 110 and 111 the braking resistor connections are changed to those shown at Fig. 5 and the regulator 32 is again reset so that the braking efforts can be made to progress through the curves 111 to 115 by varying the resistor 95. The resultant continuous operating point must fall below the curve A of Fig. 6, since this curve represents the limit of operation of the curves 101 to 115, inclusive, as determined by the capacity of the system. The above operating sequence will ordinarily be controlled from a manually-operable controller arranged to carry out the proper braking resistor switching operations and simultaneously to recalibrate the regulator 32 as well as to provide intermediate control notches for selectably resetting the resistor 95 between changes of braking resistor connections.

I wish to have it understood that it is not essential to the practice of my invention that the regulator 32 be responsive solely to motor field excitation current, but that, if desired, the regulator may be responsive in part to the motor armature current.

As previously mentioned, it is necessary to recalibrate the current regulator 32, whenever the resistance of the dynamic braking resistor is changed. For this purpose a variable calibrating resistor 95 is connected in series with the floating coil 93. While I have shown the calibrating resistor 95 and the various braking resistor control switches 50 to 55, inclusive, as manually-operable, I wish to have it understood that these switches and the calibrating resistor may be, and preferably are, controlled either mechanically or electromagnetically in their proper sequence by means of a rotatable manually-operable controller of the drum type such as is well known to those skilled in the art.

From the foregoing detailed description, it will now be evident that I have provided a dynamic braking arrangement in which the braking resistor comprises a plurality of sections selectably connectable in various circuit relationships such that the over-all resistance may be changed in a plurality of steps, while making use of every section at all times. Furthermore, I have provided a differential dynamic braking system utilizing a resistor of this type and in which a smooth and gradual increase in braking effort is obtained as the vehicle speed decreases by maintaining constant the traction motor field exciting current at various values during each interval between transfer of braking resistor connections.

While I have illustrated one preferred embodiment of my invention by way of illustration, many further modifications will undoubtedly occur to those skilled in the art, and I therefore wish to have it understood that I intend by the appended claims to cover all such modifications as fall within the true spirit and scope of my invention.

What I claim as new and desire to secure by Letters Patent of the United States, is:

1. In a dynamic braking system, a momentum-driven dynamo-electric machine having an armature and a series field winding, a braking resistor connected to complete a dynamic braking circuit including said armature, voltage generating means connected in series with said field winding across a portion of said dynamic braking circuit thereby to supply an excitation current to said series field winding, regulating means operable in conjunction with said voltage generating means to maintain said excitation current substantially constant, and means for changing the resistance of said braking resistor in a plurality of predetermined steps and simultaneously recalibrating said regulating means.

2. In a dynamic braking system, a momentum-driven dynamo-electric machine having an armature and a series field winding, a multi-section braking resistor connected to complete a dynamic braking circuit including said armature, a substantially constant speed generator connected in series circuit relation with said series field winding across a portion of said dynamic braking circuit thereby to provide an excitation current for said winding, switching means for connecting the sections of said multi-section braking resistor in selectable combinations of series and parallel circuit relation thereby to change the equivalent resistance of said resistor in a plurality of steps, and field control means for said generator responsive to said excitation current and arranged to maintain said current substantially constant at predetermined selectable values while said resistor sections remain connected in any selected one of said combinations.

3. In a dynamic braking system, a direct current momentum-driven dynamo-electric machine having an armature and a series field winding, a multisection braking resistor connected to complete a dynamic braking circuit including said armature, a direct current generator for supplying an excitation current to said series field winding, switching means arranged to connect said generator and said series field winding to a portion of said dynamic braking circuit in such manner that the voltage of said generator opposes the voltage developed in said armature during dynamic braking, second switching means for connecting said sections of said braking resistor in selectable combinations of series and parallel circuit relation thereby to change the equivalent resistance of said braking resistor in a plurality of steps, and field control means operable in conjunction with said generator to maintain said excitation current at predetermined selectable substantially constant values while any selected connection is maintained by said second switching means.

4. In a dynamic braking system for a self-propelled electric vehicle, a plurality of direct current traction motors each having an armature and a series field winding, a plurality of multi-section dynamic braking resistors for said motors, first switching means arranged to complete a plurality of dynamic braking circuits each including at least one of said armatures and one of said braking resistors, a substantially constant speed direct current generator for supplying excitation current to said series field windings, second switching means arranged to connect all said series field windings in an excitation circuit including said generator and a portion of each of said dynamic braking circuits, third switching means for connecting said sections of said dynamic braking resistors in selectable combinations of series and parallel circuit relation thereby to change the equivalent resistance of said resistors in a plurality of steps, field control means operable in conjunction with said direct current generator to regulate said excitation current while said equivalent resistance remains at any selected value, and means for resetting said field control means upon operation of said third switching means.

5. In a dynamic braking system for a self-propelled electric vehicle, a plurality of pairs of direct current traction motors each provided with an armature and a series field winding, a direct current generator for supplying current to said motors to drive said vehicle, an internal combustion engine for driving said generator, a multisection dynamic braking resistor for each said pair of motors, first switching means arranged to complete a plurality of dynamic braking circuits, each said circuit including one of said dynamic braking resistors and the armatures of at least one pair of said direct current motors, a stabilizing resistor connected in each of said braking circuits, second switching means operable when said internal combustion engine is rotating at its idling speed to connect said generator to a field excitation circuit including all of said series field windings and said stabilizing resistors, said dynamic braking circuits and said field excitation circuit being so interconnected by means of said stabilizing resistors that the voltage of said generator opposes the voltages developed in said armatures during dynamic braking, third switching means for connecting the sections of said multi-section dynamic braking resistors in selectable combinations of series and parallel circuit relation thereby to change the equivalent resistance of said resistors in a plurality of steps, voltage control means operable in conjunction with said generator to regulate the current in said series field windings while said equivalent resistance remains at any selected value, and means for resetting said voltage control means upon operation of said third switching means.

6. In a dynamic braking system, a momentum-driven dynamo-electric machine having an armature and a series field winding, a braking resistor connected to complete a dynamic braking circuit including said armature, voltage generating means connected in series with said field winding across a portion of said dynamic braking circuit thereby to supply an excitation current to said series field winding, switching means for changing the resistance of said braking resistor in a plurality of steps, voltage control means operable in conjunction with said voltage supply means to maintain said excitation current substantially constant at selectable values while said resistance remains at any selected value, and means operable in conjunction with said switching means for changing the calibration to said voltage control means.

7. In a dynamic braking system, a momentum-driven dynamo-electric machine having an armature and a series field winding, a braking resistor connected to complete a dynamic braking circuit including said armature, a substantially constant speed generator connected in series with said series field winding across a portion of said dynamic braking circuit thereby to supply to said series winding an excitation current, a regulator operable in conjunction with said generator to maintain said excitation current substantially constant, means for reducing the resistance of said braking resistor in a plurality of predetermined steps, voltage control means for said regulator responsive to said excitation current, and means for changing the calibration of said voltage control means thereby to select a predetermined excitation characteristic to be maintained for each predetermined value of said resistance.

8. In a dynamic braking system for a self-propelled electric vehicle, a direct current traction motor provided with an armature and a series field winding, a direct current generator, an internal combustion engine for driving said generator, an exciter for said generator driven by said internal combustion engine, an exciting winding for said exciter, means for energizing said exciting winding, a braking resistor connected to complete a dynamic braking circuit including said armature, switching means for connecting said generator to supply excitation current to said series field winding, and means responsive solely to said excitation current to control the energization of said exciting winding.

9. In a dynamic braking system for a self-propelled electric vehicle, a direct current traction motor provided with an armature and a series field winding, a direct current generator, an internal combustion engine connected to drive said generator, an exciter for said generator driven by said internal combustion engine, an exciting winding for said exciter, a resistor connected in series circuit relation with said exciting winding, a dynamic braking resistor connected to complete a dynamic braking circuit including said armature, switching means for connecting said generator in series circuit relation with said series field winding across a portion of said dynamic braking circuit thereby to supply an excitation current to said series field winding, and electromagnetic means responsive to said excitation current arranged to control said resistor thereby to maintain said excitation current substantially constant.

10. In a dynamic braking system for a self-propelled electric vehicle, a direct current traction motor provided with an armature and a series field winding, a direct current generator, an internal combustion engine connected to drive said generator, an exciter for said generator driven by said internal combustion engine, an exciting winding for said exciter, a control resistor connected in series circuit relation with said exciter winding, a dynamic braking resistor connected to complete a dynamic braking circuit including said armature, switching means for varying the resistance of said dynamic braking resistor, second switching means for connecting said generator in series circuit relation with said series field winding across a portion of said dynamic braking circuit thereby to supply an excitation current to said series field winding, means responsive to said excitation current for varying said resistance of said control resistor to maintain said excitation substantially constant, and means operable in conjunction with said switching means for varying the response of said resistance varying means.

11. In a dynamic braking system for a self-propelled electric vehicle, a plurality of direct current traction motors each having an armature and a series field winding, a direct current generator, an internal combustion engine for driving said generator, an exciter for said generator driven by said internal combustion engine, an exciting winding for said exciter, a control resistor connected in series circuit relation with said exciting winding, a plurality of multi-section dynamic braking resistors for said motors, first switching means arranged to complete a plurality of dynamic braking circuits each including at least one of said armatures and one of said braking resistors, second switching means arranged to complete an excitation circuit for said series field windings including said generator and a portion of each of said dynamic braking circuits, said generator supplying an excitation current to said series field windings, third switching means for connecting said sections of said dynamic braking resistors in selectable combinations of series and parallel circuit relation thereby to change the equivalent resistance of said resistors in a plurality of steps, an electromagnetic relay having an actuating coil responsive to said excitation current arranged to vary the resistance of said control resistor, a calibrating resistor in series with said actuating coil, and means operable in conjunction with said third switching means for varying the resistance of said calibrating resistor.

12. In a dynamic braking system for an electric motor, the combination of a motor having a field winding, a multi-section braking resistor for said motor, and switching means for connecting the sections of said braking resistor in selectable combinations of series and parallel circuit relation to reduce the equivalent resistance of said resistor without disabling any of said sections.

13. In a dynamic braking system, a momentum-driven dynamo-electric machine having an armature, a dynamic braking resistor including a plurality of sections connected to complete a dynamic braking circuit including said armature, means for connecting at least two pairs of said sections permanently in parallel circuit relation, and switching means for connecting the individual sections of each of said pairs selectively in series or parallel circuit relation.

14. In a dynamic braking system, a momentum-driven dynamo-electric machine having an armature and a series field winding, a dynamic braking resistor including a plurality of separate sections arranged to be connected to complete a dynamic braking circuit including said armature, voltage generating means connected in series with said series field winding across a portion of said dynamic braking circuit thereby to supply an excitation current to said series field winding, switching means for connecting at least two pairs of said separate resistor sections permanently in parallel circuit relation, second switching means for connecting the separate sections of each of said pairs selectively in series or parallel circuit relation, and means responsive to said excitation current arranged to control said voltage supply means to maintain said excitation current substantially constant.

15. In a dynamic braking system, a momentum-driven dynamo-electric machine having an armature and a series field winding, a dynamic braking resistor including a plurality of separate sections of equal resistance arranged to be connected to complete a dynamic braking circuit including said armature, voltage generating means connected in series with said series field winding across a portion of said dynamic braking circuit thereby to supply an excitation current to said series field winding, switching means for connecting at least two pairs of said separate resistor sections permanently in parallel circuit relation, each of said pairs comprising two sections of equal resistance and each section of one of said pairs having double the resistance of each section of said other pair, second switching means for connecting the separate sections of each of said pairs selectably in series or parallel circuit relation, and means responsive to said excitation current arranged to control said voltage supply means.

HAROLD S. OGDEN.